United States Patent [19]

Le Rat et al.

[11] Patent Number: 4,650,635

[45] Date of Patent: Mar. 17, 1987

[54] PROCESS FOR THE MONITORING OF LEAKS IN THE PRIMARY CIRCUIT OF A PRESSURIZED WATER NUCLEAR REACTOR

[75] Inventors: Guy Le Rat, Torcy; Stéphane Vivet, Chatenay-Malabry, both of France

[73] Assignee: Framatome & Cie., Courbevoie, France

[21] Appl. No.: 650,382

[22] Filed: Sep. 13, 1984

[30] Foreign Application Priority Data

Sep. 13, 1983 [FR] France .................. 83 14509

[51] Int. Cl.⁴ .......................................... G21C 17/00
[52] U.S. Cl. ..................................... 376/250; 376/216
[58] Field of Search ................... 376/250, 216; 73/40, 73/40.5 R, 45.5; 137/551, 557, 558

[56] References Cited

U.S. PATENT DOCUMENTS

| | | | |
|---|---|---|---|
| 3,155,595 | 11/1964 | Schluderberg | 376/250 |
| 3,699,802 | 10/1972 | Hotta et al. | 376/250 |
| 4,491,008 | 1/1985 | Marini et al. | 376/250 |

Primary Examiner—Salvatore Cangialosi
Attorney, Agent, or Firm—Pollock, Vande Sande & Priddy

[57] ABSTRACT

The invention relates to a process for monitoring leaks in the primary circuit of a pressurized water nuclear reactor.

The primary circuit consists of the vessel (1), the primary part of the steam generators (6), pipework (3, 4), the pressurizer (10) and various stocktanks (20). Connected to the primary circuit is at least one auxiliary circuit such as the circuit for volumetric and chemical monitoring comprising a stocktank (17). A sectioning of the primary circuit and of the circuit for volumetric and chemical monitoring into volume elements, excluding the stocktanks (20, 17) is determined. At regular time intervals, or steps, the mass of water in each of the volume elements and in each of the stocktanks is determined from measurements of pressure, temperature and levels and then, by addition, of the total mass of water. The means values of the masses of water are calculated over periods of time corresponding to a multiple of the steps and offset in time by at least one step, together with the difference of the mean values corresponding to two successive periods of time, the difference representing the leakage flow in the primary circuit.

The invention applies in particular to nuclear reactors with three or four loops.

2 Claims, 4 Drawing Figures

PROCESS FOR THE MONITORING OF LEAKS IN THE PRIMARY CIRCUIT OF A PRESSURIZED WATER NUCLEAR REACTOR

FIELD OF THE INVENTION

The invention relates to a process for the monitoring of leaks in the primary circuit of a pressurized water nuclear reactor.

The primary circuit of nuclear reactors which are cooled with water under pressure corresponds to the part of this reactor which contains water under pressure for cooling the reactor core. This primary circuit therefore comprises the reactor vessel enclosing the core, the primary part of the steam generators, the inner volume of the pressurizer and of the pipes for circulating pressurized water, connecting each of the steam generators to the vessel independently, each of the parts of the circuit comprising a steam generator and a system of pipes which are connected to the vessel and form a loop of the primary circuit. The primary circuit is also connected to auxiliary circuits including the circuit for volumetric and chemical monitoring of the pressurized water. This auxiliary circuit which is arranged branching on the primary circuit makes it possible both to maintain the quantity of water in the primary circuit by replenishing, when required, with measured quantities of water and to monitor the chemical properties of the cooling water, particularly its content of boric acid which is involved in the operation of the reactor. During the periods when the chemical properties of the reactor water are adjusted, it may be necessary to carry out tappings or injections into the primary circuit, the quantities tapped or injected being known and controlled in a highly accurate manner.

Outside these periods of injections or tappings, the valves connecting auxiliary circuits other than the circuit for volumetric and chemical control to the primary circuit are closed. The primary circuit is then theoretically isolated and completely sealed, with the result that the quantity of water in this primary circuit is theoretically constant. In practice, however, it is observed that this quantity of cooling water diminishes during the operation of the reactor, as a consequence of unavoidable leaks which can be monitored and perfectly evaluated or, on the contrary, unmonitored. The unmonitored leaks can themselves be localized or unlocalized and, in the latter case, the evaluation of the magnitude of these leaks is particularly difficult.

It is nevertheless very important to have good knowledge of the leakage rate of the primary circuit, in order to undertake preventive actions before accidental leaks become more serious and call into question the safety of operation of the nuclear reactor.

PRIOR ART

Various processes have been proposed for detecting leaks in a closed circuit. It has been proposed, for example, to employ sound detectors to show the presence of a leak greater than a limit value at a location in the circuit. This process, however, does not make it possible to estimate the total of the leaks from the circuit and indications given are not really quantitative.

There has also been proposed, in French Patent No. 2,214,992, a process making use of a level control in an expansion vessel arranged in the circuit and a measurement of the temperature of the fluid in the closed circuit. If the changes in level in the expansion vessel are incompatible with the change in the mean temperature of the fluid, it is concluded from this that the changes in level are due to leaks. A replenishment of liquid is then carried out in the expansion vessel until the level returns to a predetermined level which is a function of the mean temperature of the fluid. This process, which permits the presence of leaks to be detected, does not however allow them to be estimated quantitatively in a precise manner.

U.S. Pat. No. 3,712,750 describes a process for detecting leaks in the cooling circuit of the primary circuit of a nuclear reactor. The leaks are collected in a drainage sump under the reactor vessel and the leak liquid collected evaporates in the reactor safety housing. During the treatment before recirculation of air in the reactor housing the traces of tritium which may be present in the water vapor present in this air are measured. The radioactivity in the reactor housing air can also be measured directly.

This process, which permits the leaks to be determined in a more or less quantitative manner, is, however, highly complex in use.

SUMMARY OF THE INVENTION

The aim of the invention is therefore to offer a process for monitoring leaks in the primary circuit of a pressurized water nuclear reactor comprising a vessel enclosing the reactor core, at least two steam generators connected independently to the vessel by pipework for circulating water under pressure, a pressurizer, at least one auxiliary circuit for monitoring and replenishment of the water under pressure and stocktanks inserted in the primary circuit and in the auxiliary circuit, this monitoring process permitting a quantitative determination of the total leaks from the primary circuit with very high accuracy and employing only conventional, easily operated means of measurement.

To this end, a sectioning of the internal volume of the primary circuit and of the circuit for volumetric and chemical monitoring, excluding the stocktanks, is determined, as a function of the characteristics of the primary circuit, into a set of volume elements in which the temperature and the pressure of the water are equal at any point in the volume element with a predetermined margin of error, during the operation of the reactor, at fixed time intervals, called "steps", during the operation of the reactor:

the level of the pressurized water is measured inside each of the stocktanks, the pressure and the temperature of the pressurized water are measured in each of the volume elements, the mass of water in each of the stocktanks and in each of the volume elements is calculated as a function of the measured temperatures, pressures and levels, the total mass of water in the primary circuit is calculated by adding the masses of water in the volume elements and in the stocktanks, and for periods of time which correspond to a multiple of the step and which are offset by at least one step, the mean of the masses of water in the primary circuit and the difference of the mean values corresponding to two successive periods of time are calculated, the difference representing the leakage flow of the primary circuit.

BRIEF DESCRIPTION OF THE DRAWINGS

To make the invention well understood, a description will be given, by way of non-limiting example, with reference to the attached figures, of an example of embodiment of the process according to the invention.

DETAILED DESCRIPTION

Figure 1:
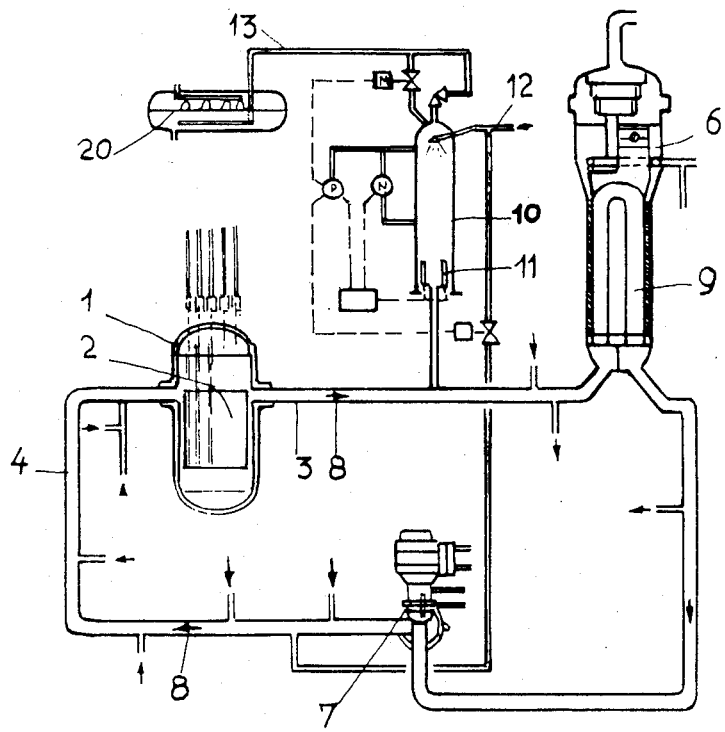
FIG. 1 shows the primary circuit of a pressurized water nuclear reactor.

FIG. 1 shows a loop of a primary circuit of a pressurized water nuclear reactor. The nuclear reactor comprises a vessel 1 enclosing the reactor core 2 and connected by pipework 3 and 4 to a steam generator 6 and a primary pump 7 enabling the pressurized water to be circulated inside the pipework 3 and 4 in the direction of the arrows 8.

The pipework 3 receiving the high temperature pressurized water leaving the core forms the hot branch of the reactor, while the conduit 4, which ensures the return of the pressurized water to the vessel 1, after its passage through the steam generator 6, forms the cold branch of the primary circuit.

The steam generator 6 comprises a nest of tubes 9 inside which pressurized water circulates to heat the steam generator feed water which is heated and then vaporized before being conveyed to the turbine of the nuclear power station.

Shown in FIG. 1 is the loop of the primary circuit which includes the pressurizer 10 which provides the pressure control in the primary circuit. For this purpose, electric heating elements 11 enter the lower part of the pressurizer. An auxiliary spray 12 and a device 13 for relieving the pressurizer permit the water to be returned to its nominal pressure in the event of an overshoot.

Figure 2:
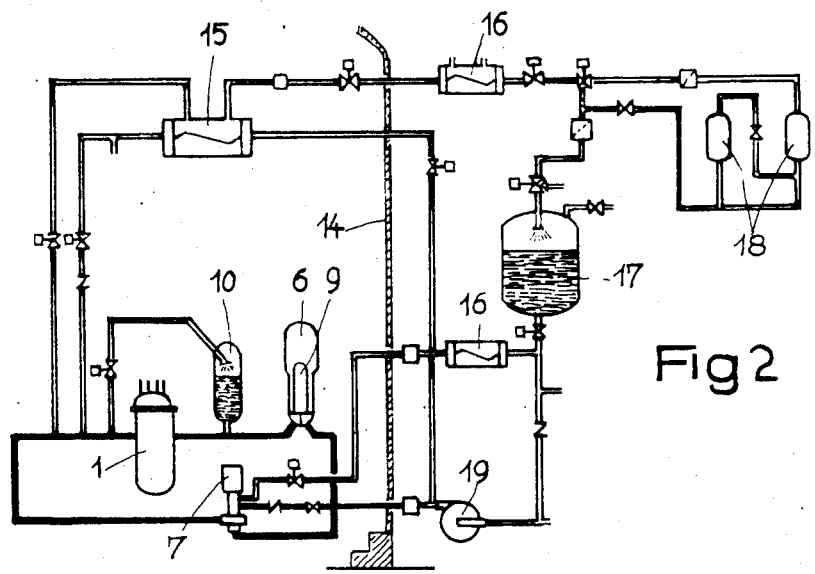
FIG. 2 shows the circuit for volumetric and chemical control associated with the primary circuit of this reactor.

FIG. 2 shows the circuit for volumetric and chemical monitoring (VCM) of the nuclear reactor connected as a branch of one of the loops of this reactor which is identical to the branch shown in FIG. 1.

A part of the circuit for volumetric and chemical monitoring is outside the reactor safety housing 14, the part arranged inside the safety housing 14 comprising a heat exchanger 15 for cooling and depressurizing the primary fluid before it leaves the housing 14.

The VCM circuit comprises, outside the housing 14, heat exchange coolers 16, a replenishment stocktank 17 and demineralization units 18. A feed pump 19 enables the fluid to be circulated inside the VCM circuit.

A set of valves permits the VCM circuit to be isolated from the primary circuit when it is not in service.

To make use of the process according to the invention it is necessary to determine, for the entire internal volume of the primary circuit excepting the stocktanks present in it, a sectioning into volume elements chosen so that within these volume elements the temperature and the pressure are sufficiently uniform for the subsequent calculations of masses of water to be meaningful. In practice, the volume elements are chosen so that the temperature and the pressure are equal at any point of the volume element, taking into account a predetermined tolerable margin of error which makes it possible to carry out the calculations of the mass of water with a tolerable maximum error.

The knowledge of the distribution of temperature and pressure in the primary circuit of a pressurized water reactor, for example a nuclear reactor with three loops, having an electric power of 900 MW has enabled nineteen volume elements to be determined inside the primary circuit, volumes inside which the temperature and the pressure remain sufficiently homogeneous and constant during the operation of the reactor. Account is also taken of the three stocktanks communicating with the primary circuit, namely the pressurizer relief stocktank 20 (FIG. 1), the stocktank for collection of the localized leaks from the primary circuit and the storage stocktank for the primary effluent treatment.

So far as the auxiliary VCM circuit, shown in FIG. 2, is concerned, its internal volume is sectioned into three volume elements and account is taken of the stocktank 17 permitting the volumetric monitoring of the primary circuit.

For each of these volume elements or stocktanks the temperature and the pressure of the water in the volume element or stocktank in question are measured at some regular intervals during the operation of the reactor. Where the stocktanks are concerned, the water level in this stocktank is measured in addition at the same regular intervals.

Finally, signals representing measurements of pressure and temperature levels, and signals describing the state of opening or closing of the valves in the primary circuit and in the auxiliary circuit are collected, to provide knowledge of the possible flows of water being removed or added to the mass of water in the primary circuit at the time of the measurement.

The measurement of the parameters considered above make it possible to calculate the masses of water in the stocktanks and in the volume elements of the primary circuit and of the auxiliary circuit at the time of the measurement.

In practice, pressure and temperature sensors are arranged in the region of each of the volume elements and stocktanks, together with level sensors in each of the stocktanks. These sensors transmit the results of the measurement in the form of signals to a central computer unit which carries out the determination of the mass of water using water tables stored in a memory.

The calculation must take into account water in a liquid form and water in the form of steam inside each of the determined volumes.

For example, in the case of the pressurizer, a single volume is considered inside which water and steam under pressure are in equilibrium. The water volume comprises the bottom of the pressurizer and the cylindrical volume of the water column above it.

The volume of steam in the pressurizer comprises the total cylindrical volume of the pressurizer minus the volume corresponding to the column of water and the volume of the upper dished part of the pressurizer.

The level in the pressurizer is therefore measured, as in the case of the stocktanks, for calculating the mass of water.

The internal primary volume of the steam generators consists of the sum of the inner volumes of the nest of tubes.

The volume of each cold branch of the reactor consists of the volume of the water box on the side of the water delivery into the steam generator, the volume of the primary pump and the volume of the pipework connecting the primary pump to the steam generator and to the vessel, the volume of the bypass pipework and the volume of the spray pipework of the pressurizer.

So far as the circuit for volumetric and chemical monitoring of the reactor is concerned, its volume is small relative to the volume of the primary circuit, with the result that the disparities of temperature in this circuit have little effect on the final calculation of the mass of water and of the rate of leakage. Consequently, a sectioning of this VCM circuit into only three volume elements is chosen.

The principle of determination of the mass of water is based on the calculation of the volume occupied by this water as a function of the measured pressure and temperature. The volume element at the reactor operating pressure P and temperature T is obtained using the formula:

$$Vi\ (PiTi) = Vi\ cold\ (1 + \alpha i\ Ti + xi\ Pi)$$

where
$Vi\ (PiTi)$ = volume element at the reactor operating pressure P and temperature T
$Vi\ cold$ = volume element when cold
$\alpha i$ = expansion coefficient of the volume element i
$xi$ = compressibility coefficient for the volume element i.

The water tables stored in a memory in the computer make it possible to obtain the density of the water at a pressure and temperature corresponding to the temperature and the pressure of the volume element i. The mass of water enclosed in each volume element is therefore calculated by multiplying the volume element $Vi\ (PiTi)$ by the density of water at the temperature T and pressure P.

In the more complex parts such as the reactor core and the steam generators, a modelling of the temperature has been carried out so as to approach the integral referring to the volume element i $\int\int Vi\rho(Ti\ Pi)\ dvi$ using an expression of the type $Vi\ (T\ av.i,\ Pi)\ \rho(T\ av.i,\ Pi)$.

Where the stocktanks and the pressurizer are concerned, account is taken of the measured level in the stocktank to determine the volume of water in the latter. The relationship between the level and the volume enclosed by the stocktank has been memorized in the computer to enable this calculation to be made.

The frequency with which the various parameters of pressure, temperature and level are acquired can be slightly different and the calculation will be carried out at a frequency, or step, equal to or slightly above the maximum frequency of acquisition of the measured parameters.

In the case of a nuclear reactor with three loops considered above, the step is of twenty seconds and the computer makes it possible to obtain an accurate value of the masses of water in each of the volume elements and stocktanks every twenty seconds. The computer carries out the summation of these element values of the mass of water so that the total mass of water present at any instant in the primary circuit is known.

Where the reactor vessel is concerned, the following volume elements are discerned:
the volume of the vessel on the cold side consisting of the entering volume of the water from the cold branches and the dead volume occupied by the water before it passes into the core,
the volume of the core which is available for the passage of water,
the volume of the upper part of the vessel or plenum,
finally, the three volumes corresponding to the hot branches, determined as shown above.

Figure 3:
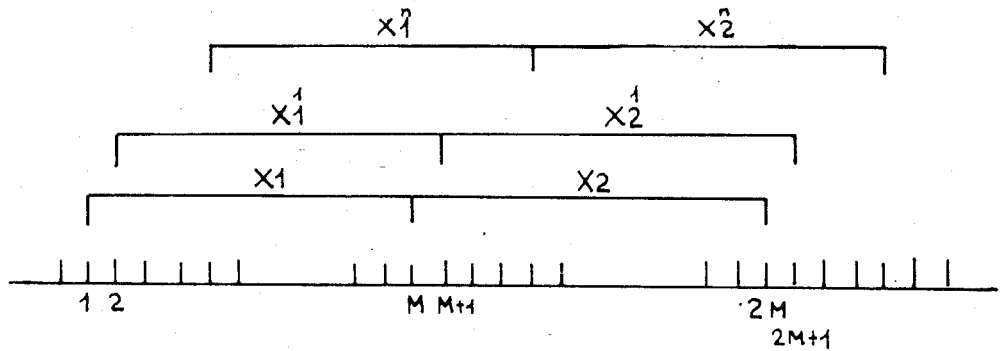
FIG. 3 is a diagram showing the periods of time for which leakage calculations are carried out.

FIG. 3 shows the principle of calculation of the masses of water in the primary circuit on a time basis.

The time scale is shown on the bottom line of the diagram, with a graduation in steps of twenty seconds. Each of the graduations $1, 2, \ldots m, m+1, \ldots$ denotes the moment of acquisition of a value for the mass of water in the primary circuit.

The upper lines in the diagram represent periods of time $X1, X2, \ldots$, representing a whole number of 20-second steps.

A time period which is equal to thirty minutes, that is to say to ninety steps of twenty seconds, has been selected for the determination of the mass of water and of the rate of leakage from the reactor in the example referred to above.

Each of the periods $X1, X2, \ldots$ therefore represents thirty minutes or ninety steps.

The total mean mass of water in the primary circuit during any period X of ninety steps is equal to the sum of the ninety values of the total mass determined at each of the steps, divided by ninety.

This calculation of the mean value is carried out not only for the successive thirty-minute periods $X1, X2, \ldots$ but also for periods of the same length which are offset by one step $(X1_1, X1_2, \ldots)$ or by any number of steps $(Xn_1, Xn_2, \ldots)$ which is less than ninety.

Pairs of mean values are thus determined over successive periods $X1\ X2, X1_1\ X1_2, Xn_1\ Xn_2$, of a fixed duration of thirty minutes.

The computer determines the difference between these mean values in the course of two successive periods of thirty minutes, which gives a value of the leakage flow at a given moment corresponding to some number of steps.

The value of the leakage flow at the following step will be determined by the difference of the mean values calculated over periods which are offset by one step relative to the preceding periods ($X1_1$ and $X1_2$).

At each step therefore a calculation will be carried out of a value of the leakage flow equal to the difference between the mean values of the masses of water in the primary circuit calculated over two successive periods of ninety steps.

Figure 4:
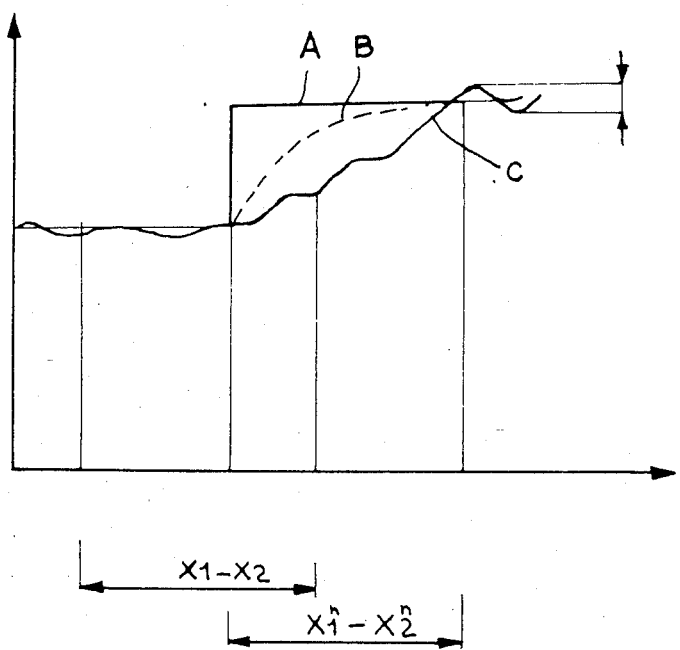
FIG. 4 is a diagram showing, in comparison, the actual leaks and leaks calculated by the method according to the invention, during the operation of a pressurized water nuclear reactor.

FIG. 4 shows, for the case of an abrupt change shown theoretically by the curve A, the curve C corresponding to the values of the leakage flow obtained by the process according to the invention.

It is seen that the calculated value of the leakage flow increases progressively until the time when it comes to equilibrium at a value which fluctuates about the new theoretical value of the leakage flow. In fact, the results of the calculation take account of the values of the mass over periods preceding the abrupt change in the leakage flow.

When the leakages are stabilized at their new value, the level of the leakage flow is nevertheless known with a high degree of accuracy, which is of the order of a few liters per hour in the case of the application considered above, to a nuclear reactor with three loops which operates continuously with an average leakage flow of the order of 100 l/h.

In fact, the actual variation in the leaks never follows a theoretical curve such as shown by A in FIG. 4 but rather a variation such as shown by B, which progresses with time.

It is therefore apparent that the process according to the invention enables the total rate of leakage of the primary circuit of the reactor to be calculated with a very high degree of accuracy without recourse to measurements other than measurements of level, temperature and pressure in this circuit.

The value of unmonitored leaks can be obtained by subtracting from the value of the total leaks the mean value of the monitored leaks over the period which corresponds to the calculation of the total leaks.

It is obvious that the invention is not limited to the embodiment which has just been described but that, on the contrary, it comprises all the alternative forms.

Thus the sectioning of the primary circuit and the refinement of the modelling can be produced in a different manner from that which has been desribed, as a function of the characteristics of this primary circuit and of the variation in the temperature and the pressure of the water in its various parts.

Similarly, given a regularity of acquisition of data which are required for the calculation of the mass of water, it is possible to establish periods for the calculation of the mean of this mass of water which correspond to any number of data acquisition steps.

Nevertheless, the period for calculating the mean value must not drop below a certain value so that the assessment of the leakage flow can be carried out with adequate accuracy.

In the case of a nuclear reactor with three loops and of a sectioning and calculating procedure such as those described above, it is necessary to choose a period of time M which is longer than ten minutes.

The invention applies to any type of primary circuit of a pressurized water nuclear reactor which has association with it one or more auxiliary circuits such as a circuit for volumetric and chemical monitoring.

We claim:

1. A process for the monitoring of leaks from the primary circuit of a pressurized water nuclear reactor comprising a vessel (1) enclosing the reactor core (2), at least two steam generators (6) connected independently to the vessel by pipework (3, 4) for circulating water under pressure, a pressurizer (10), at least one auxiliary circuit for monitoring and replenishment of the pressurized water and stocktanks (20, 17) inserted in the primary circuit and in the auxiliary circuit, in which process:
   a sectioning of the internal volume of the primary circuit and of the circuit for volumetric and chemical monitoring, excluding the stocktanks (20, 17) is determined as a function of the characteristics of the primary circuit, into a set of volume elements in which the temperature and the pressure of the water are equal at any point of the volume element with a predetermined margin of error, during the operation fo the reactor,
   at fixed intervals of time, called "steps", during the operation of the reactor:
   the level of the pressurized water is measured inside each of the stocktanks (20, 17),
   the pressure and the temperature of the pressurized water are measured in each of the volume elements and stocktanks,
   the mass of water in each of the stocktanks and in each of the volume elements is calculated as a function of the measured temperatures, pressures and levels,
   the total mass of water in the primary circuit is calculated by addition of the masses of water in the volume elements and in the stocktanks, and, over periods of time corresponding to a multiple of the step and offset in time by at least one step, the mean of the masses of water in the primary circuit and the difference in the mean values corresponding to two successive periods of time are calculated, the difference representing the leakage flow of the primary circuit.

2. The process for monitoring leaks as claimed in claim 1, wherein the state of opening or closing of the valves in the primary circuit and in the auxiliary circuit is recorded to take account of possible flows of water capable of increasing or reducing the mass of water in the primary circuit.

* * * * *